United States Patent
Mair et al.

(10) Patent No.: US 6,912,008 B2
(45) Date of Patent: Jun. 28, 2005

(54) METHOD OF ADDING DATA TO A DATA COMMUNICATION LINK WHILE RETAINING BACKWARD COMPATIBILITY

(75) Inventors: Hugh Mair, Fairview, TX (US); Gordon Gammie, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 390 days.

(21) Appl. No.: 09/978,823

(22) Filed: Oct. 15, 2001

(65) Prior Publication Data

US 2002/0186322 A1 Dec. 12, 2002

Related U.S. Application Data

(60) Provisional application No. 60/296,924, filed on Jun. 8, 2001.

(51) Int. Cl.[7] .................................................. H04N 7/00
(52) U.S. Cl. ......................... 348/462; 348/467; 348/484
(58) Field of Search ................................ 348/462, 467, 348/461, 484, 482, 480, 423.1; 341/52, 55, 58, 95; 704/500, 501; 725/148

(56) References Cited

U.S. PATENT DOCUMENTS

| | | | | |
|---|---|---|---|---|
| 4,583,074 A | * | 4/1986 | Okamoto et al. ............. 341/95 |
| 5,491,479 A | * | 2/1996 | Wilkinson .................... 341/58 |
| 5,633,632 A | * | 5/1997 | Ido et al. ....................... 341/58 |
| 6,268,847 B1 | * | 7/2001 | Glen ........................... 345/604 |
| 6,633,243 B2 | * | 10/2003 | Mair et al. .................... 341/50 |
| 2003/0016305 A1 | * | 1/2003 | Champion et al. .......... 348/649 |

\* cited by examiner

*Primary Examiner*—Victor R. Kostak
(74) *Attorney, Agent, or Firm*—William B. Kempler; W. James Brady, III; Frederick J. Telecky, Jr.

(57) ABSTRACT

A method of adding auxiliary data, e.g., audio data, to a high-speed serial video link in such a way that it is invisible to existing receiver and such that auxiliary data, e.g., audio, can be transmitted without any knowledge of the capabilities of the display to receive the auxiliary data. Some of the DC balancing bits are used to transport the auxiliary data information over the link in a manner that does not change the data recovered by a DVI-CE receiver, or a legacy receiver (installed base). DC balancing is also maintained, but with differences over known techniques. Since the auxiliary data bits (which are occupying the time slots of the DC balance bits) will be interpreted by legacy receivers as DC balance bits, the data must be optionally inverted to remain consistent with the value of the auxiliary data bit being transmitted. The DC balance bit that is transmitted at the beginning of each group of four words must also invert the value of the auxiliary data to allow the DC balancing to be achieved independent of the auxiliary data.

11 Claims, 5 Drawing Sheets

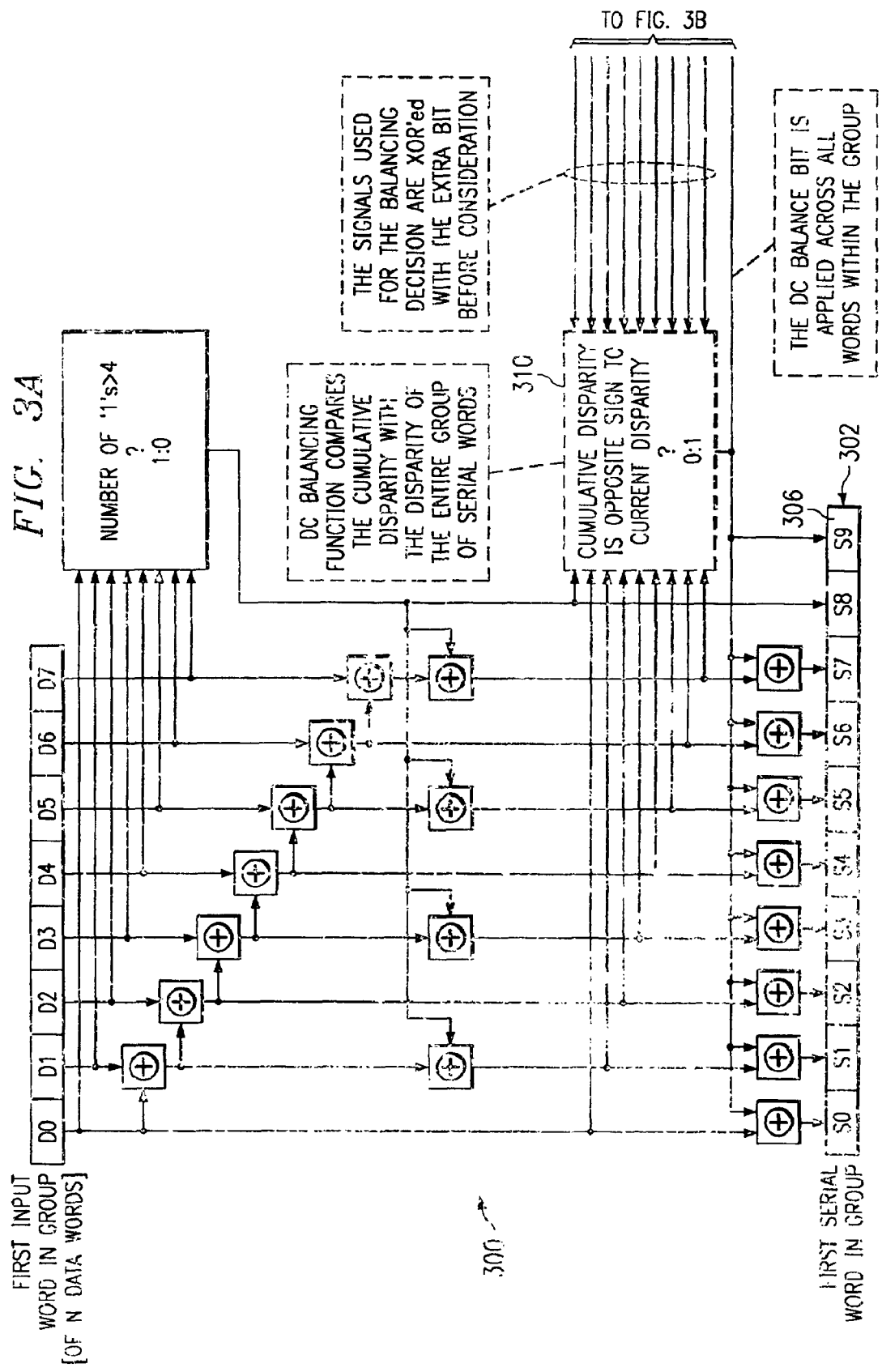

METHOD OF ADDING DATA TO A DATA COMMUNICATION LINK WHILE RETAINING BACKWARD COMPATIBILITY

RELATED PATENT APPLICATIONS

This application claims priority under 35 USC § 119 (e)(1) of Provisional Application No. 60/296,924, filed Jun. 8, 2001.

This application is related to co-pending U.S. patent application Ser. No. 60/296,924, entitled *Method For Adding Additional Data To A Communication Link While Retaining Backward Compatibility* (Attorney Docket No.: TI-33146PS), filed on Jun. 8, 2001 and co-pending U.S. patent application entitled *New Encoding Algorithm Providing Compatibility With a Class of DVI Receivers*, filed on Aug. 17, 2001.

BACKGROUND OF THE INVENTION

1. Field of the Invention

This invention relates generally to data encoding, and more particularly to a method of adding auxiliary data, e.g., audio data, to a high-speed serial video link in such a way that it is invisible to existing receivers and such that the auxiliary data can be transmitted without any knowledge of the capabilities of the display to receive the auxiliary data.

2. Description of the Prior Art

The Digital Visual Interface Specification, Revision 1.0 (DVI 1.0), published by the Digital Display Working Group (DDWG) describes an encoding scheme that should be used for transmission of video data across an interconnecting cable in a compliant system. The DVI 1.0 encoding algorithm involves the expansion of 8-bit video data to a 10-bit serial word. During active video times, the video data is encoding, and during inactive video times, two binary signals are encoded. On one channel, for example, these two binary signals are used to represent horizontal and vertical synchronizing signals. For active video, the input word is denoted as D0 through D7 (D0 is the LSB). The serial word is denoted S0 through S9 (where S0 is the LSB and the first bit to be sent). The algorithm is defined in FIG. 1 where '^' is defined as an exclusive-OR operation, TC is a 'Transition Control' bit, and DC is a 'DC Balance Control' bit, as described in further detail herein below.

In order to be able to identify active video data from non-active video data, the inventors of the prior art algorithm set forth above identified the number of transitions within the 10-bit word as a key characteristic that could be detected. Furthermore, certain characters could be sent to uniquely identify the LSB/MSB positions within the serial data stream. In order to prevent the active video characters from being misinterpreted, the TC bit is used to reduce the number of transitions within an active data symbol.

EXAMPLE

Assume DC=0 (DC has a separate, independent function described herein below), with TC=0, a binary data symbol (LSB)11111111(MSB) would be first encoded as (LSB)1010101010(MSB). Since the goal of the algorithm is to minimize the number of transitions for active data, the TC bit must be set (i.e. perform transition control), and hence the character would be fully encoded as (LSB)111111100(MSB).

Further, if one assumes that the preceding bit in the serial stream has a logic value of '1', it can be shown that all 8-bit input data can be encoded into a 10-bit code with fewer than six 0-to-1 or 1-to-0 transitions.

The DC Balance Control bit is used to optionally invert bits S0 through S7 in order to maintain a DC bias close to zero. The goal of the encoder is to transmit exactly the same number of ones and zeros over a period of time. The encoder keeps a running count of the number of ones and zeros that it has transmitted within the current active video period. If there is a disparity between the number of ones and the number of zeros that have been sent, the encoder will adjust the DC Balance Control bit to ensure that the current character, at worst, does not add to this disparity, and typically will cause the disparity to bias itself towards zero.

EXAMPLE

If the first active data symbol is (LSB)10000000(MSB), the encoder will transmit the serial code (LSB)1111111110 (MSB). This will accumulate a disparity of +8 (i.e. nine '1's and one '0' have been sent). If the second active data symbol is (LSB)01000000(MSB), the transmitter can send either (LSB)0111111110(MSB) or (LSB)1000000011(MSB). These two characters have individual disparities of +6 and −4 respectively. Since it is desirable to maintain a cumulative disparity close to zero, the second character must be sent; hence the cumulative disparity will become +4 ([+8]+ [−4]).

For the purpose of DVI 1.0, there are four synchronization characters that represent inactive video data. The particular value that should be sent depends on the state of the two additional binary signals that are transmitted during inactive video:

EXAMPLE (C1, C0)=(0, 0): (LSB)0010101011(MSB)
(C1, C0)=(0, 1): (LSB)1101010100(MSB)
(C1, C0)=(1, 0): (LSB)0010101010(MSB)
(C1, C0)=(1, 1): (LSB)1101010101(MSB)

As described above, each 8-bit word is expanded to 10 bits for transmission. One of the added bits is used for DC balancing, as stated herein before, to allow the signal to be AC coupled as in a fiber optics system. This is done by optionally inverting the 8-bit data to generate more 'ones' or 'zeros' as necessary. The DC balance bit then indicates to the receiver that this inversion took place.

In view of the foregoing, an encoding scheme that enhances the TMDS encoding algorithm described in the DVI 1.0 specification such that auxiliary data, e.g., audio data, can be added to a high-speed serial video link in such a way that the auxiliary data is invisible to existing receivers, and such that the auxiliary data can be transmitted without any knowledge of the capabilities of the display to receive the auxiliary data, would provide great advantages over the prior art.

SUMMARY OF THE INVENTION

The prior art DVI signaling method performs an 8B/10B encoding for the data being sent on the link. The two additional bits perform specific and distinct function:

1) Bit 8 is used to indicate a translation that the data may go through for the purpose of transition minimization. If the number of transitions (0→1, or 1→0) is greater than 4, then the absence of a transition is encoded. In this way, the number of transitions in the transmitted word will always be less than or equal to 4.

2) Bit 9 is used to indicate the optional inversion of bits 0 through 7. This inversion is used to ensure that during the transmission of active video, the number of logic 1 and 0 bits sent remains approximately the same.

The present invention is directed to a method of adding auxiliary data, e.g., audio data, to a high-speed serial video link in such a way that it is invisible to existing receivers and such that the auxiliary data can be transmitted without any knowledge of the capabilities of the display to receive the auxiliary data. Some of the DC balancing bits are used to transport the auxiliary data, e.g., audio information, over the link in a manner that does not change the data recovered by a DVI-CE receiver, or a legacy receiver (installed base). DC balancing is also maintained, but with differences over known techniques. Since the auxiliary data bits (which are occupying the time slots of the DC balance bits) will be interpreted by legacy receivers as DC balance bits, the data must be optionally inverted to remain consistent with the value of the auxiliary data bit being transmitted. The DC balance bit that is transmitted at the beginning of each group of four words must also invert the value of the auxiliary data bits to allow the DC balancing to be achieved independent of the auxiliary data.

In one aspect of the invention, a method of adding audio data to a high-speed serial video link is implemented without using clock modulation.

In another aspect of the invention, a method of adding audio data to a high-speed serial video link is implemented having two to three times the bandwidth of prior art solutions.

In yet another aspect of the invention, a method of adding audio data to a high-speed serial video link is implemented without adding data dependent jitter to the clock.

In still another aspect of the invention, a method of adding audio data to a high-speed serial video link is implemented that does not require any prior knowledge that the receiver can receive audio data. Prior art solutions require the knowledge that the receiver can receive audio data before it is sent to avoid sending unexpected data to a legacy receiver. The interrogation step to determine the capability of the receiver is problematic.

BRIEF DESCRIPTION OF THE DRAWINGS

Other aspects, features and advantages of the present invention will be readily appreciated as the invention becomes better understood by reference to the following detailed description when considered in connection with the accompanying drawings in which like reference numerals designate like parts throughout the figures thereof and wherein:

FIG. 4 illustrates a technique for using some of the DC balancing bits to transport audio information using a four word group over the communications link in a manner that does not change the data recovered by either a DVI-CE receiver, or a legacy receiver (installed base)

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
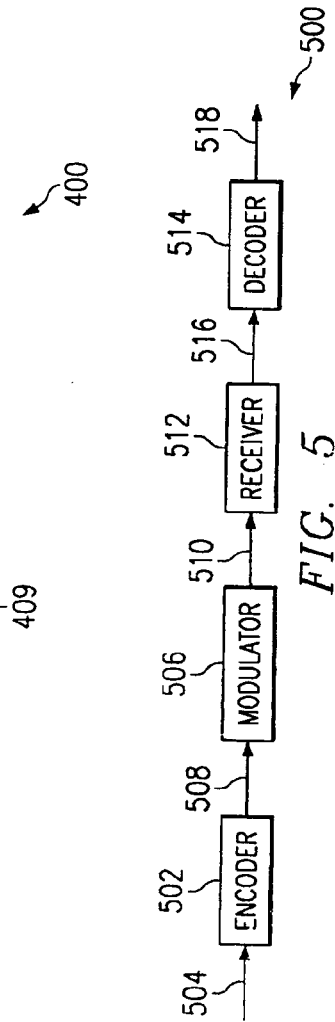
FIG. 1 illustrates the prior art (DVI 1.0) digital visual interface encoding algorithm.
Figure 2:
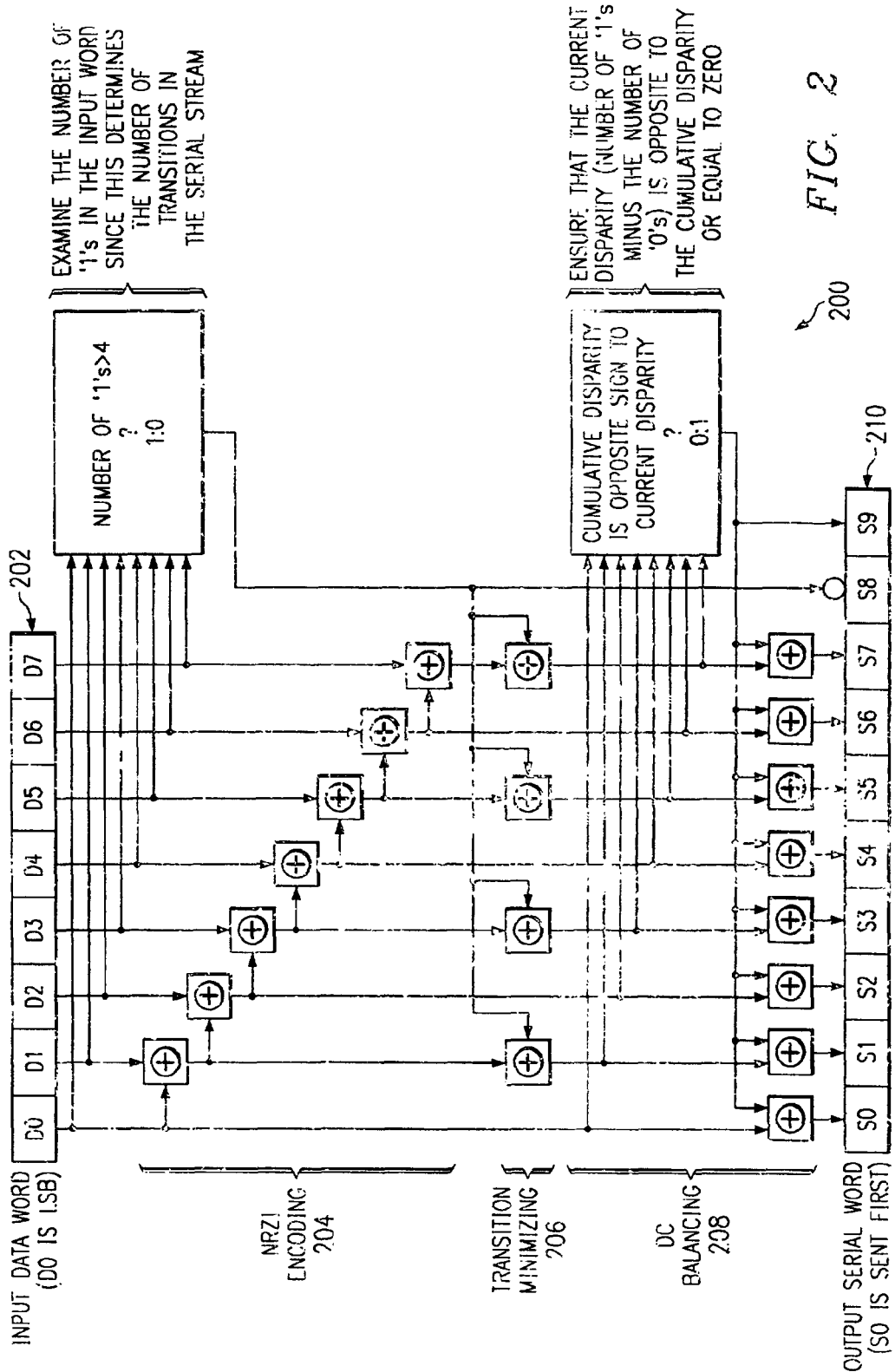
FIG. 2 is a block diagram illustrating prior art DVI encoding concepts.

The present embodiments are best understood by first setting forth a brief synopsis of the prior art with reference to FIGS. 1 and 2. The Digital Visual Interface Specification, Revision 1.0 (DVI 1.0), as stated above, describes an encoding scheme that should be used for transmission of video data across an interconnecting cable in a compliant system. The DVI 1.0 encoding algorithm involves the expansion of 8-bit video data to a 10-bit serial word. During active video times, the video data is encoding, and during inactive video times, two binary signals are encoded. On one channel, for example, these two binary signals are used to represent horizontal and vertical synchronizing signals. For active video, the input word is denoted as D0 through D7 (D0 is the LSB). The serial word is denoted S0 through S9 (where S0 is the LSB and the first bit to be sent). The algorithm is illustrated in FIG. 1 where '^' is defined as an exclusive-OR operation, TC is a 'Transition Control' bit, and DC is a 'DC Balance Control' bit, as described in further detail herein below.

As stated above, each 8-bit word is expanded to 10 bits for transmission. One of the added bits is used for DC balancing to allow the signal to be AC coupled as in a fiber optics system. This is done by optionally inverting the 8-bit data to generate more 'ones' or 'zeros' as necessary. The DC balance bit then indicates to the receiver that this inversion took place.

FIG. 2 is a block diagram illustrating prior art DVI encoding concepts 200. Current word processing, using these prior art encoding concepts 200, is only influenced by the cumulative disparity from all the previous words in the current video line. An input data word 202 is shown as D0–D7, where D0 is the least significant bit (LSB) and D7 is the most significant bit (MSB). An NRZI encoding scheme 204 is implemented in association with the input data word 202 to examine the number of '1's in the input word 202, since this determines the number of transitions in the serial stream. A transition minimizing scheme 206 is then implemented to minimize the number of transitions. Following transition minimization 206, DC balancing 208 is implemented to ensure that the current disparity (number of '1's minus the number of '0's) is opposite to the cumulative disparity or equal to zero. As stated herein before, bit 8 is used to indicate a translation that the data may go through for the purpose of transition minimization. If the number of transitions (0→1, or 1→0) is greater than 4, then the absence of a transition is encoded. In this way, the number of transitions in the transmitted word will always be less than or equal to 4. Bit 9 is used to indicate the optional inversion of bits 0 through 7. This inversion is used to ensure that during the transmission of active video, the number of logic 1 and 0 bits sent remains approximately the same. Following transition minimizing 208 and DC balancing 208, the 10-bit output serial word (S0-S9) 210 is then transmitted over the data communication link in which the LSB (S0) is sent first.

Figure 3B:
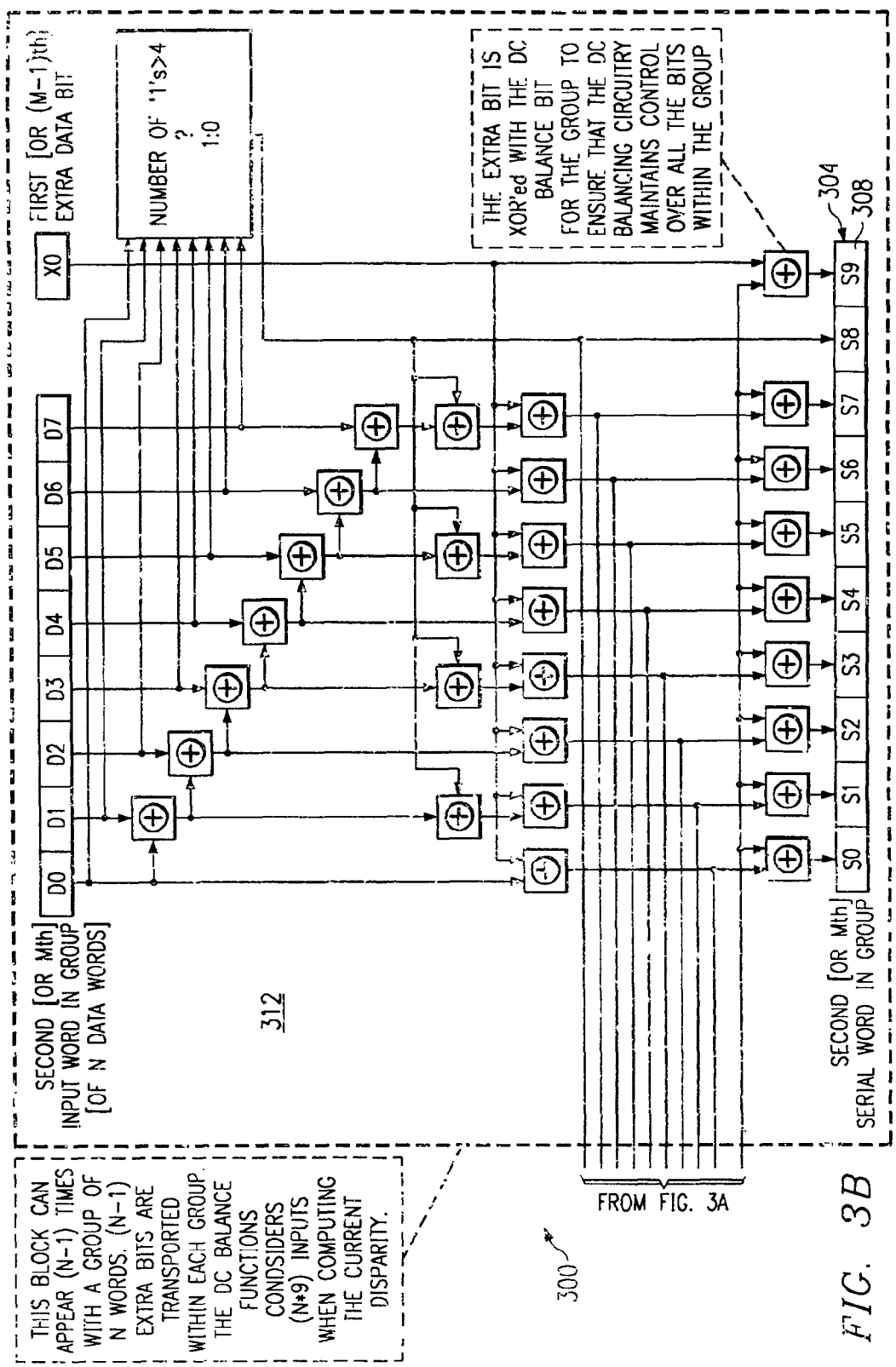
FIG. 3 is a block diagram illustrating DVI encoding according to one embodiment of the present invention.

FIG. 3 is a block diagram illustrating DVI encoding 300 according to one embodiment of the present invention. Although the encoding scheme 300 shows a group of two words 302 and 304, it shall be understood the present invention is not so limited, and that the encoding scheme 300 can be easily extended to N words, wherein N is a positive integer greater than 1. It can be appreciated then that the DC balancing function discussed herein before must now consider the effect of all N words when determining the current disparity.

Principle of Operation

Using the DE (data enable) signal as a synchronization point, the pixels are considered in sequential groups of N words. Since each channel is separate, one can consider the operation of a sequence of two 10-bit words (enumerated '302' and '304' in FIG. 3) on a single channel. The first word 302 will be unmodified except in the consideration given to the disparity value when deciding whether to invert the data for DC balancing in a manner such as described herein before. The subsequent word 304, will have its DC balance bit S9 replaced with auxiliary data, e.g., audio data. Since bits 0 through 7 of the second word 304 will be inverted by the receiver (based on the audio data), the inverse operation must be performed prior to transmission. To allow for the stream to be DC balanced, the single valid DC balance bit 306 must be able to influence most of the bits in the group of 20 bits associated with output serial words 302, 304. This is done by allowing the DC balance bit 306 to invert not only bits 0 through 7 of its own word 302, but also the auxiliary data (e.g., audio bit) 308 that appears in the subsequent output serial word 304. Since the auxiliary data bit 308 must also control the inversion of bits 0 through 7 of its respective output serial word 304, the DC balance bit 306 ultimately controls the polarity of 18 of the group of 20 bits associated with output serial words 302, 304. Specifically, the auxiliary data bit (audio bit) 308 is XOR'ed with the DC balance bit 306 for the group 302, 304 to ensure that the DC balancing circuitry maintains control over all the bits within the group 302, 304. It can be seen that the DC balancing function 310 compares the cumulative disparity with the disparity of the entire group of serial words 302, 304 and that the DC balance bit 306 is applied across all words within the group 302, 304. The signals used for the balancing decision are XOR'ed with the auxiliary data (e.g., audio) bit 308 before consideration. It can also be appreciated that the encoding scheme depicted in the second block 312 can appear (N-1) times within a group of N words such that (N-1) extra bits are transported within each group. The DC balance function 310 will then consider (N*9) inputs when computing the current disparity.

During the inactive video time (DE inactive), transition maximized codes are sent. Since these codes do not contain DC balancing, the above method cannot be used. Since there are however, two control signals available for use, the present method employs use of these signals to allow continuous transmission of audio data.

The available bandwidth for the case where N=4, for example, can be considered for both active and inactive video regions for a pixel clock frequency, for example, of 25 MHz. The audio bandwidth available then during active region=25 MHz*(¾)*3=56 Mbits/sec and the audio bandwidth available during inactive region=25 MHz*2=50 Mbits/sec.

FIG. 4 illustrates a technique 400 for using some of the DC balancing bits to transport audio information over a communications link in a manner that does not change the data recovered by either a DVI-CE receiver, or a legacy receiver (installed base) that employs a sequential group of 4 words (N=4). The first word 402 will again be unmodified except in the consideration given to the disparity value when deciding whether to invert the data for DC balancing in a manner such as discussed above with reference to FIG. 3. The three subsequent words 404, 406, 408 will have their DC balance bits 405, 407, 409 replaced with audio data (X0, X1 and X2 respectively). Since bits 0 through 7 of words 2, 3 and 4 (404, 406, 408) will be inverted by the receiver (based on the audio data), the inverse operation must be performed prior to transmission. So that the data stream can be DC balanced, the single valid DC balance bit 403 must be able to influence most of the bits in the group of 40 bits associated with words 1 through 4. This is done by allowing the DC balance bit 403 to invert not only bits 0 through 7 of its own word 402, but also the three audio bits 405, 407, 409 that appear in the three subsequent words 404, 406, 408. Since the audio bits 405, 407, 409 must also control the inversion of bits 0 through 7 of their respective words 404, 406, 408, the DC balance bit 403 ultimately controls the polarity of 36 of the group of 40 bits associated with words 402, 404, 406 and 408. As stated herein before with reference to FIG. 3, transition maximized codes that do not contain DC balancing are sent during the inactive video time (DE inactive). The embodiments discussed herein use the two control signals however, to allow continuous transmission of audio data during such inactive video times.

Figure 5:
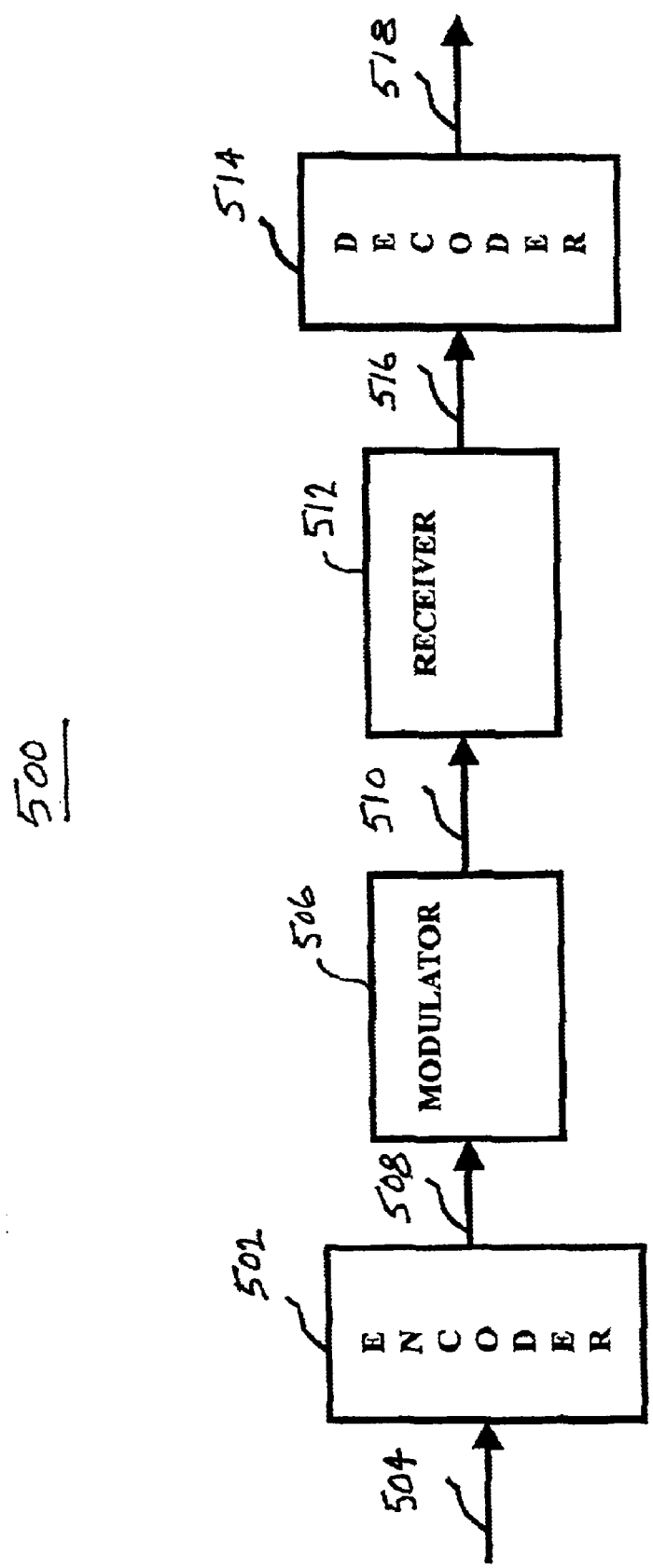
FIG. 5 is a block diagram illustrating a typical system configuration suitable for implementing the encoding techniques depicted in FIGS. 3 and 4.

FIG. 5 is a block diagram illustrating a typical system configuration 500 suitable for implementing the encoding techniques 300, 400 depicted in FIGS. 3 and 4 respectively. Encoder 502 receives data on path 504 and encodes the data into a stream of data comprising groups N words such as described herein before. Each word group then contains N words, wherein N is an integer greater than one. Encoder 502 sends the stream of data to modulator 506 on link 508. Encoder 502 may be implemented in a known way.

Modulator 506 may encode the stream of data received on link 508 in a signal, and transmit the signal on serial communication channel 510. Communication channel 510 may also contain synchronization signals such as data enable (DE) signals discussed herein before. Modulator 506 and encoder 502 may also be implemented in a known way.

Video receiver 512 receives a signal over serial communication channel 510, and recovers the auxiliary data discussed herein before encoded in the signal in accordance with embodiments of the present invention. Receiver 512 may send the recovered auxiliary data via path 516 to decoder 514 that decodes the auxiliary data to generate data on path 518. If the recovery of the auxiliary data is accurate, the data on path 518 equals the data on path 504. The auxiliary data, as described herein before, can be transmitted without any knowledge of the capabilities of the video receiver 512 to receive the auxiliary data.

This invention has been described in considerable detail in order to provide those skilled in the digital visual interface signaling art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of adding auxiliary data to a serial video data stream comprising the steps of:

generating a data stream in sequential groups of N 10-bit words, wherein each 10-bit word comprises 8 video data bits (S0–S7) and a most significant bit (S9), and further wherein N is an integer greater than one;

combining the most significant bit (S9) associated with first 10-bit word in each group with an auxiliary data bit (Xm) to generate the most significant bit (S9) associated with the second and each subsequent 10-bit word in each group; and combining the video data bits (S0–S7) associated with each 10-bit word in each group of N 10-bit words with the respective most significant bit (S9) associated with each 10-bit word in each group of N 10-bit words to generate a resultant data stream.

2. The method according to claim 1 further comprising the step of transmitting the resultant data stream to a receiver via a serial transmission video link.

3. The method according to claim 1 wherein the step of combining the most significant bit (S9) associated with the first 10-bit word in each group with an auxiliary data bit (Xm) comprises performing an Exclusive Or (XQR) operation between the auxiliary data bit (Xm) and the most significant bit (S9) associated with the first 10-bit word in each group.

4. The method according to claim 1 wherein the step of combining the most significant bit (S9) associated with the first 10-bit word in each group with an auxiliary data bit (Xm) to generate the most significant bit (S9) associated with the, second and each subsequent 10-bit word in each group comprises combining an auxiliary data bit that is unique to each second and subsequent word in each group with the most significant bit associated with the first 10-bit word in each group such that the total number of auxiliary data bits is no greater than N–1 for each group.

5. The method according to claim 4 wherein the step of combining an auxiliary data bit that is unique to each second and subsequent word in each group with the most significant bit associated with the first 10-bit word in each group comprises performing an Exclusive Or (XOR) operation between the auxiliary data bit that is unique to each second and subsequent word in each group with the most significant bit associated with the first 10-bit word in each group.

6. The method according to claim 1 wherein the step of generating a data stream in sequential groups of N 10-bit words comprises generating a data stream in response to a synchronization signal.

7. The method according to claim 1 wherein the step of combining the most significant bit (S9) associated with the first 10-bit word in each group with an auxiliary data bit (Xm) to generate the most significant bit (S9) associated with the second and each subsequent 10-bit word in each group comprises combining the most significant bit associated with the first 10-bit word in each group with at least one data bit selected from the group consisting of a non-inverted auxiliary bit, an inverted auxiliary bit, and a DC Balance Control bit.

8. A method of adding auxiliary data a serial video data stream comprising the steps of:

generating a first 10-bit word comprising 8 video data bits and a most significant bit; and generating at least one additional 10-bit word, wherein each additional 10-bit word comprises 8 video data bits and a most significant bit, wherein the most significant bit associated with each additional 10-bit word is generated by combining the most significant bit associated with the first 10-bit word with an auxiliary data bit; and wherein the ster of generating a first 10-bit word comprising 8 video data bits and a most significant bit comprises the step of generating a first 10-bit word comprising a most significant bit selected from the group consisting of non-inverted auxiliary data, inverted auxiliary data, and a DC Balance Control bit.

9. The method according to claim 8 further comprising the step of repeating the steps of generating a first 10-bit word and at least one additional 10-bit word to generate a resultant data stream.

10. The method according to claim 9 further comprising the step of transmitting the resultant data stream to a receiver via a serial transmission video link.

11. The method according to claim 8 wherein the step of generating a first 10-bit word comprises generating the first 10-bit word in response to a synchronization signal.

* * * * *